US012092582B2

(12) United States Patent
Ohno et al.

(10) Patent No.: US 12,092,582 B2
(45) Date of Patent: Sep. 17, 2024

(54) OPTICAL INSPECTION DEVICE

(71) Applicant: KABUSHIKI KAISHA TOSHIBA, Tokyo (JP)

(72) Inventors: Hiroshi Ohno, Tokyo (JP); Takashi Usui, Saitama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 17/006,935

(22) Filed: Aug. 31, 2020

(65) Prior Publication Data

US 2021/0293723 A1  Sep. 23, 2021

(30) Foreign Application Priority Data

Mar. 18, 2020 (JP) .................................. 2020-047078

(51) Int. Cl.
  *G01N 21/88* (2006.01)
  *G01B 11/14* (2006.01)
  (Continued)

(52) U.S. Cl.
  CPC ......... *G01N 21/8806* (2013.01); *G01B 11/14* (2013.01); *G01B 11/24* (2013.01);
  (Continued)

(58) Field of Classification Search
  CPC ......... G01B 11/14; G01B 11/16; G01B 11/22; G01B 11/24; G01B 11/26; G01N 21/41;
  (Continued)

(56) References Cited

U.S. PATENT DOCUMENTS 2,604,809 A * 7/1952 Mitchell ................ G02B 27/54
  250/222.1
2,809,552 A * 10/1957 Ciavola .................. G03B 27/73
  355/71
(Continued)

FOREIGN PATENT DOCUMENTS

CN 107135380 A * 9/2017 ............... H04N 9/04
JP S55-6323 A 1/1980
(Continued)

OTHER PUBLICATIONS

Bixler, O.C., "Color Schlieren as a Quantitative Tool for Acoustic Measurements in Ballistics," The Journal of the Acoustical Society of America, 44, 375. (Year: 1968).*
(Continued)

*Primary Examiner* — Gordon J Stock, Jr.
(74) *Attorney, Agent, or Firm* — Finnegan, Henderson, Farabow, Garrett & Dunner, LLP

(57) ABSTRACT

An optical inspection device 1A includes a light selection unit 30, a detection element 40, and a first image formation element 20. The light selection unit 30 has the plurality of wavelength selection regions 32 that selectively transmits or reflects the light rays L of mutually different wavelength regions. The detection element 40 detects scattering characteristic information of the light rays L having reached the light receiving surface 41 via the light selection unit 30. The first image formation element 20 causes scattered light scattered by a subject S to enter a light receiving surface 41 via the light selection unit 30. The plurality of wavelength selection regions 32 has different azimuth angles with respect to the optical axis z of the first image formation element 20.

12 Claims, 11 Drawing Sheets

(51) Int. Cl.
  *G01B 11/24* (2006.01)
  *G01N 21/41* (2006.01)
  *G01N 21/47* (2006.01)
(52) U.S. Cl.
  CPC ......... *G01N 21/41* (2013.01); *G01N 21/4133* (2013.01); *G01N 21/47* (2013.01)
(58) Field of Classification Search
  CPC ...... G01N 21/45; G01N 21/455; G01N 21/47; G01N 21/49; G01N 21/4133; G01N 21/53; G01N 21/8806; G01N 2021/4106; G01N 2021/4133; G01N 2021/4173; G01N 2021/4193; G01N 2021/4153; G01N 2021/4721; G01N 2021/4728; G02B 5/20; G02B 5/201; G02B 5/204; G02B 5/22; G02B 5/226; G02B 5/23; G02B 5/26; G02B 5/28; G02B 5/1876; G02B 21/00; G02B 21/0004; G02B 21/0032; G02B 21/004; G02B 21/0044; G02B 21/0052; G02B 21/0064; G02B 21/008; G02B 21/088; G02B 21/10; G02B 21/12; G02B 21/125; G01M 11/02; G01M 11/0207; G01M 11/0221; G01M 11/0228; G01M 11/0235; G01M 11/0242; G01M 11/0257; G01M 11/0271; G01M 9/06; G01M 9/065; G01M 9/067; G01J 9/00; G01J 2009/002; G01J 2009/004; G01W 2001/003
  See application file for complete search history.

(56) References Cited

U.S. PATENT DOCUMENTS

| | | | | |
|---|---|---|---|---|
| 3,533,706 A * | 10/1970 | Byal | ................. | G01N 21/896 65/158 |
| 3,681,519 A * | 8/1972 | Larsen | ................. | G02B 27/46 348/E9.003 |
| 3,767,306 A * | 10/1973 | Mast | ................. | G01N 21/94 356/336 |
| 3,772,506 A * | 11/1973 | Junginger | ............. | F21V 7/0008 359/833 |
| 5,148,323 A * | 9/1992 | Campbell | ............. | G02B 27/46 359/740 |
| 5,331,466 A * | 7/1994 | Van Saarloos | ......... | G02B 27/09 359/710 |
| 5,353,133 A * | 10/1994 | Bernkopf | ............. | G03B 21/625 349/137 |
| 6,181,416 B1 * | 1/2001 | Falk | ................. | G01N 21/455 324/762.01 |
| 8,949,078 B2 * | 2/2015 | Berkner | ............. | G02B 5/201 703/1 |
| 9,453,995 B2 * | 9/2016 | Clark | ................. | G02B 21/0088 |
| 9,531,963 B2 * | 12/2016 | Yamanaka | ............. | H04N 23/55 |
| 9,867,544 B2 * | 1/2018 | Kim | ................. | A61B 5/0075 |
| 9,958,265 B2 * | 5/2018 | Nagai | ................. | G01N 21/8422 |
| 10,018,890 B2 * | 7/2018 | Toriumi | ............. | H04N 5/2253 |
| 10,117,579 B2 * | 11/2018 | Gao | ................. | A61B 3/14 |
| 10,212,401 B2 * | 2/2019 | Sato | ................. | H04N 25/13 |
| 10,775,704 B2 * | 9/2020 | Pandey | ............. | G01N 21/4788 |
| 10,866,186 B2 * | 12/2020 | Schoegl | ............. | H04N 17/02 |
| 11,115,573 B2 * | 9/2021 | Fahringer | ............. | H04N 23/957 |
| 11,122,242 B2 * | 9/2021 | Ono | ................. | H04N 25/75 |
| 11,193,824 B2 * | 12/2021 | Liang | ................. | G01J 3/0291 |
| 11,249,289 B2 * | 2/2022 | Bodkin | ................. | H04N 23/11 |
| 2002/0163638 A1 * | 11/2002 | Biel | ................. | G01M 11/0278 356/239.2 |
| 2009/0195788 A1 * | 8/2009 | Dosaka | ............. | G01M 11/0271 356/513 |
| 2014/0078379 A1 * | 3/2014 | Masuda | ............. | G01J 3/2823 348/360 |
| 2014/0152983 A1 * | 6/2014 | Masuda | ................. | G01J 3/51 356/302 |
| 2014/0375994 A1 * | 12/2014 | Yamanaka | ............. | G01J 3/524 356/402 |
| 2015/0116526 A1 * | 4/2015 | Meng | ................. | H04N 23/951 348/218.1 |
| 2016/0037022 A1 * | 2/2016 | Matsuzaki | ............. | H04N 23/11 348/335 |
| 2016/0241797 A1 * | 8/2016 | Ye | ................. | H04N 25/11 |
| 2016/0356702 A1 * | 12/2016 | Hinnrichs | ............. | G01J 3/0208 |
| 2017/0155883 A1 | 6/2017 | Kusumi et al. | | |
| 2018/0259394 A1 * | 9/2018 | Gotoh | ................. | G01J 3/504 |
| 2019/0212552 A1 * | 7/2019 | O'Neill | ................. | G01J 3/51 |
| 2019/0219501 A1 | 7/2019 | Ohno et al. | | |
| 2020/0378899 A1 * | 12/2020 | Cho | ................. | G01N 21/455 |
| 2021/0131961 A1 * | 5/2021 | Ohno | ................. | G01N 21/47 |
| 2022/0229033 A1 * | 7/2022 | Kester | ................. | G01J 5/0896 |
| 2022/0385863 A1 * | 12/2022 | Kishine | ................. | G03B 7/00 |

FOREIGN PATENT DOCUMENTS

| | | | |
|---|---|---|---|
| JP | H05187987 A | * | 1/1992 |
| JP | 2002-328094 A | | 11/2002 |
| JP | 3385432 B2 | * | 3/2003 |
| JP | 2005-339879 A | | 12/2005 |
| JP | 2006-24681 A | | 1/2006 |
| JP | 2008-209726 A | | 9/2008 |
| JP | 2010-96559 A | | 4/2010 |
| JP | 2010-251168 A | | 11/2010 |
| JP | 2015-132509 A | | 7/2015 |
| JP | 2016-75590 A | | 5/2016 |
| JP | 2017-72888 A | | 4/2017 |
| JP | 2017-101934 A | | 6/2017 |
| JP | 2019-124542 A | | 7/2019 |
| WO | WO 2017/164134 A1 | | 9/2017 |
| WO | WO-2018143340 A1 | * | 8/2018 ................ G01J 3/02 |

OTHER PUBLICATIONS

Settles, G.S., Schlieren and Shadowgraph Techniques: Visualizing Phenomena in Transparent Media, 2001, Springer-Verlag Berlin Heidelberg GmbH. (Year: 2001).*
Stricker, Josef et al., "Bidirectional quantitative color schlieren," 2006, Optical Engineering 45(12), 123604, pp. 1-6. (Year: 2006).*
Wang, Dongqing et al., "Two-dimensional color Schlieren system," Sep. 1990, Optical Engineering, vol. 29 No. 9, pp. 1161-1162. (Year: 1990).*
Elsinga, G.E. et al., "Assessment and application of quantitative schlieren methods: Calibrated color schlieren and background oriented schlieren," Experiments in Fluids 36 (2004) pp. 309-325. (Year: 2004).*
Jain, Deepak S. et al., "Rainbow schlieren deflectometry technique for nanofluid-based heat transfer measurements under natural convection regime," International Journal of Heat and Mass Transfer 98 (2016) pp. 697-711. (Year: 2016).*
Srivastava, Atul, "Development and application of color schlieren technqiue for investigation of three-dimensional concentration field," Journal of Crystal Growth 383 (2013) pp. 131-139. (Year: 2013).*
Wong, Tommy et al., "Quantitative measurements in an unsteady flame using high-speed rainbow schlieren deflectometry," 2006, Measurement Science and Technology 17 pp. 1503-1510. (Year: 2006).*
Howes, "Rainbow schlieren and its applications," Applied Optics, 23:2449-60 (Jul. 15, 1984).
Kim et al., "Multiaperture telecentric lens for 3D reconstruction," Optics Letters, 36:1050-52 (Apr. 1, 2011).
Wanstall et al., "Quantifying liquid boundary and vapor distributions in a fuel spray by rainbow schlieren deflectometry," Applied Optics (2017), 9 pages.
F. Higashino, "Visualization Techniques with the Aid of Optical Schlieren System," J. of the Japan Soc. for Aero. and Space Scis.,

(56) References Cited

OTHER PUBLICATIONS vol. 47, No. 550, pp. 240-245 (Nov. 5, 1999) and machine translation, 8 p.

* cited by examiner

US 12,092,582 B2

OPTICAL INSPECTION DEVICE

CROSS-REFERENCE TO RELATED APPLICATIONS

This application is based upon and claims the benefit of priority from Japanese Patent Application No. 2020-047078, filed on Mar. 18, 2020; the entire contents of which are incorporated herein by reference.

FIELD

Embodiments described herein relate generally to an optical inspection device.

BACKGROUND

Noncontact optical inspection technology is becoming important in various industries. According to the conventional optical inspection technique, there is a method using a color aperture for quantitatively measuring the magnitude of scattering of light that transmits an object.

However, conventionally, there are difficult cases of providing highly accurate scattering characteristic information of a subject.

DETAILED DESCRIPTION

Figure 1:
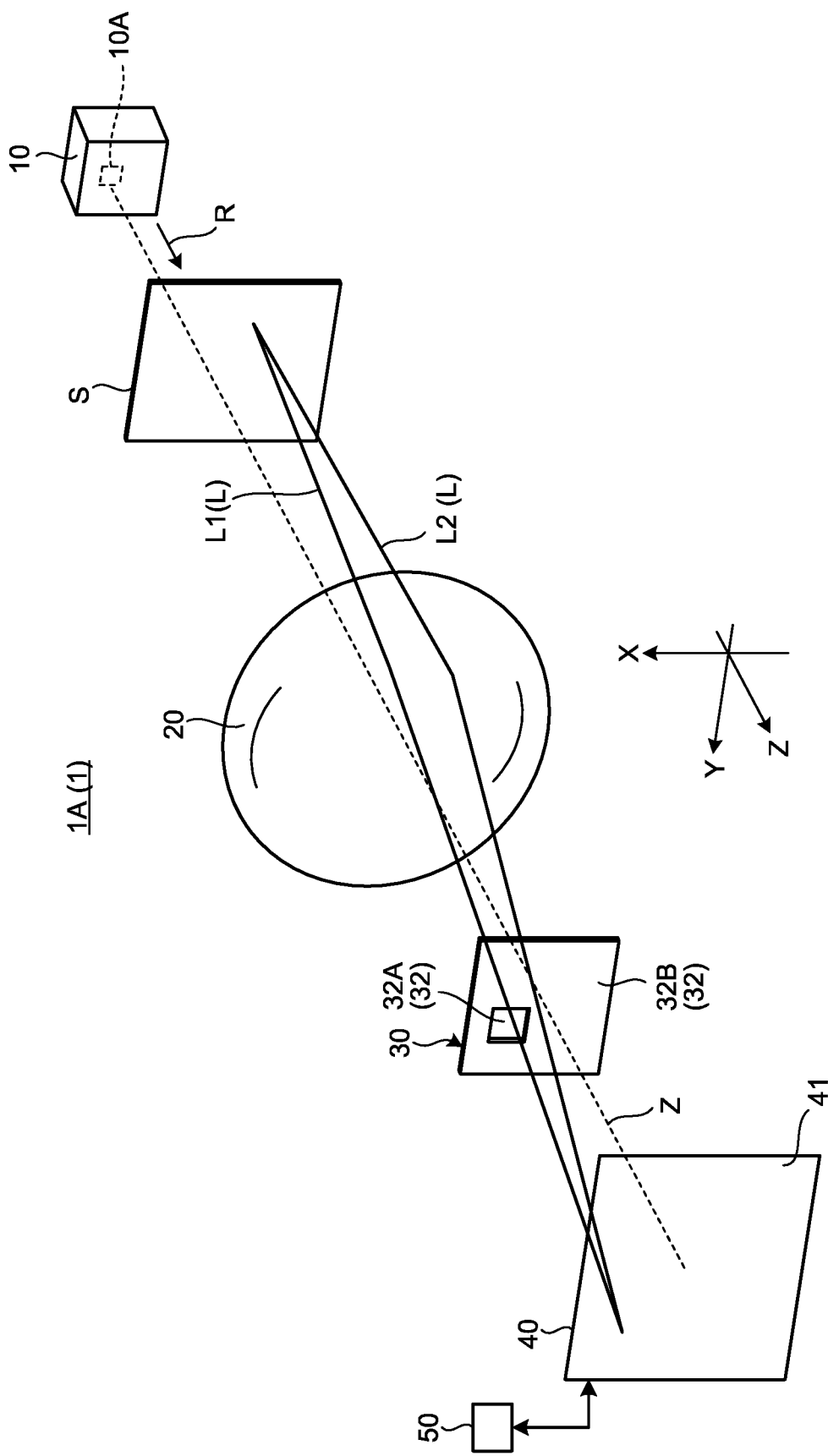
FIG. 1 is a schematic diagram of an optical inspection device according to a first embodiment.

An optical inspection device includes a light selection unit, a detection element, and a first image formation element. The light selection unit has a plurality of wavelength selection regions selectively transmitting or reflecting light rays of mutually different wavelength regions. The detection element detects scattering characteristic information of the light rays having reached a light receiving surface via the light selection unit. The first image formation element causes scattered light scattered by a subject to enter the light receiving surface via the light selection unit. The plurality of wavelength selection regions is different in azimuth angle with respect to an optical axis of the first image formation element. An optical inspection device of an embodiment will be described in detail below with reference to the accompanying drawings.

The drawings used in the description of embodiments are schematic or conceptual, and the relationship between the thickness and width of each part, the size ratio between the parts, and the like are not always the same as the actual ones. The same part may be illustrated in different dimensions or at different ratios among the drawings. In the specification and the drawings of the present application, components similar to those described above with reference to preceding drawings are marked with identical reference numerals, and detailed description thereof is omitted as appropriate.

First Embodiment

Figure 2:
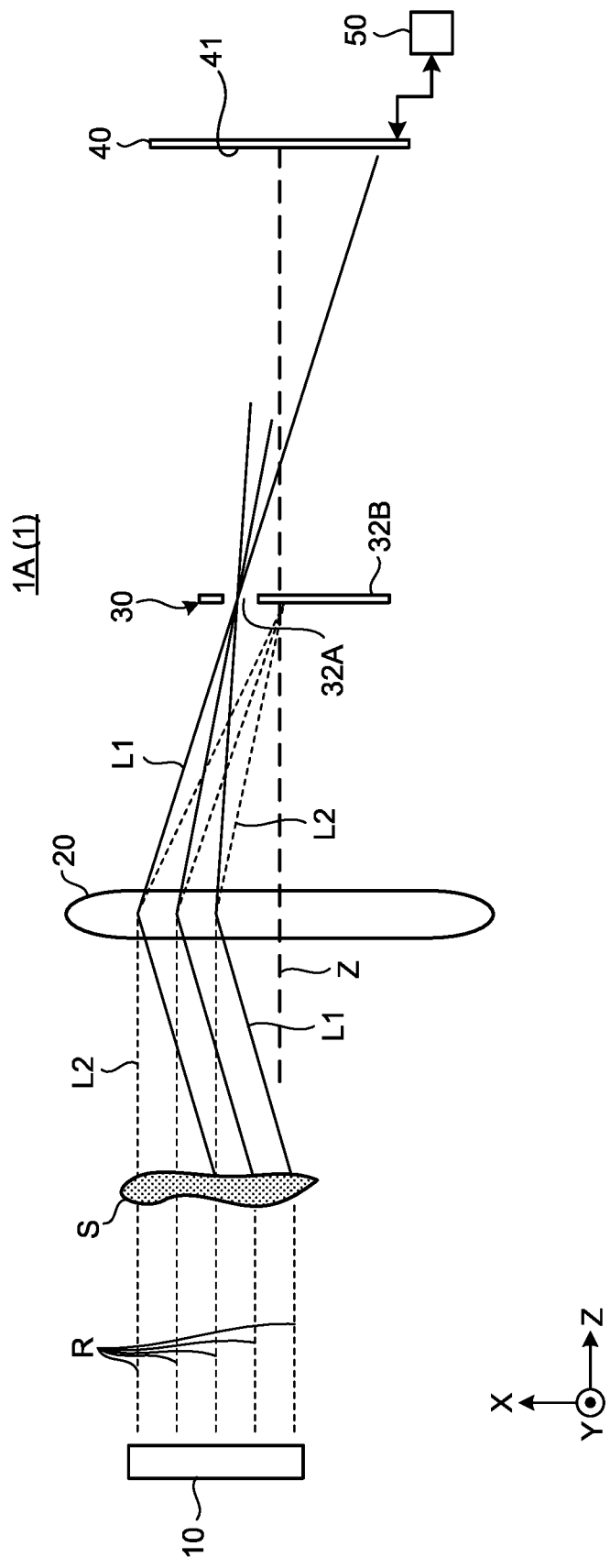
FIG. 2 is a cross-sectional view of the optical inspection device according to the first embodiment.

FIG. 1 is a schematic diagram illustrating an example of an optical inspection device 1A of the present embodiment. FIG. 2 is a cross-sectional view of the optical inspection device 1A of FIG. 1 taken along an arrow Z direction.

The optical inspection device 1A is an example of an optical inspection device. The optical inspection devices of the present embodiment and embodiments described later may be collectively described, referred to simply as an optical inspection device 1.

The optical inspection device 1A includes an irradiation unit 10, a first image formation element 20, a light selection unit 30, a detection element 40, and an information processing device 50.

The irradiation unit 10 emits a light ray R. The irradiation unit 10 includes a light source 10A. The irradiation unit 10 irradiates a subject S with the light ray R emitted from the light source 10A.

The light source 10A is, for example, a light emitting diode (LED) and emits white light. The light source 10A is not limited to the LED, and may be an incandescent light bulb, a fluorescent tube, a mercury lamp, or the like. Further, the light source 10A may be a light source that emits laser, infrared rays, X-rays, or the like. The light emitted from the light source 10A is not limited to white light. The wavelength contained in the light ray R emitted from the light source 10A may be determined according to the wavelength selectivity of the light selection unit 30 described later.

In the present embodiment, a case where the light ray R emitted from the irradiation unit 10 is an electromagnetic wave and is, for example, visible light will be described as an example. Specifically, in the present embodiment, a case where the light ray R emitted from the irradiation unit 10 includes a light ray having a wavelength in the visible light region of 400 nm to 750 nm will be described as an example. The wavelength contained in the light ray R is not limited to this wavelength.

The subject S is an inspection target for the optical inspection device 1A. The subject S may be an object that refracts or scatters the emitted light ray R. The subject S is, for example, a living cell, an object including a laser weld region, or the like, but is not limited thereto. The laser weld region is a region welded by a laser. The subject S may be any of solid, liquid, and gas. In the present embodiment, a case where the subject S is a solid will be described as an example.

In the present embodiment, a form in which the light ray R emitted from the irradiation unit 10 passes through the subject S and is scattered by the subject S will be described as an example.

The first image formation element 20 causes the scattered light emitted from the irradiation unit 10 and scattered by the subject S to enter a light receiving surface 41 of the detection element 40 via the light selection unit 30. The subject S is arranged between the first image formation element 20 and the irradiation unit 10 in a direction along an optical axis Z of the first image formation element 20.

In the present embodiment, the direction along the optical axis Z of the first image formation element 20 will be described as the arrow Z direction. Further, directions orthogonal to the arrow Z direction will be described as arrow X direction and arrow Y direction. The arrow X direction and the arrow Y direction are directions orthogonal to each other.

The first image formation element 20 may be any element having an image formation performance for forming an image of light. The first image formation element 20 is, for example, a lens, a concave mirror, or the like. The material of the first image formation element 20 is not limited. For example, the first image formation element 20 is made of optical glass or optical plastic such as acrylic resin (PMMA) or polycarbonate (PC).

The first image formation element 20 has a focal plane. The focal plane is a plane on which an object at infinity is imaged by the lens. Specifically, the focal plane is a set of points that gather when parallel light rays L enter the first image formation element 20. In particular, when the light rays L enter along the optical axis Z of the first image formation element 20, the light rays L are condensed at the focal point on the optical axis Z. That is, the focal plane is a plane including the focal point of the first image formation element 20. In the present embodiment, an XY plane that is a plane orthogonal to the optical axis Z of the first image formation element 20 and passing through the focal point constitutes the focal plane. The XY plane is a two-dimensional plane that is orthogonal to the optical axis Z (arrow Z direction) and is defined by the arrow Y direction and the arrow X direction.

The detection element 40 detects scattering characteristic information of the light rays L having reached the light receiving surface 41. The light receiving surface 41 is a surface of the detection element 40 that receives the light rays L. The light receiving surface 41 is a two-dimensional plane orthogonal to the optical axis Z of the first image formation element 20.

The detection element 40 may be any element that can output light receiving positions and light receiving intensities of the light rays L that have entered the light receiving surface 41 as the scattering characteristic information. The detection element 40 is, for example, a charge-coupled device (CCD), a complementary metal-oxide semiconductor (CMOS), or the like.

In the present embodiment, a case where the detection element 40 is an image pickup element in which photoelectric conversion elements (photodiodes) are arranged for each pixel will be described as an example. That is, in the present embodiment, a mode in which the detection element 40 detects the scattering characteristic information of the light rays L having reached the light receiving surface 41 by obtaining a captured image will be described as an example.

The light selection unit 30 is an optical mechanism having a plurality of wavelength selection regions 32. The light selection unit 30 is a plate-shaped member whose plate surface is a two-dimensional plane (XY plane) orthogonal to the optical axis Z (arrow Z direction) of the first image formation element 20.

The light selection unit 30 is arranged between the detection element 40 and the first image formation element 20 in the direction along the optical axis Z (arrow Z direction). Specifically, the light selection unit 30 is arranged on the focal plane of the first image formation element 20. The light selection unit 30 is not limited to a form in which the light selection unit 30 is completely coincident with the focal plane of the first image formation element 20. For example, the light selection unit 30 may be arranged substantially in the vicinity of the focal plane of the first image formation element 20.

The light selection unit 30 has the plurality of wavelength selection regions 32.

The plurality of wavelength selection regions 32 selectively transmits or reflects the light rays L of mutually different wavelength regions. To selectively transmit means transmitting the light ray L in a specific wavelength region and not transmitting (reflect or absorb) the light ray L in a wavelength region other than the specific wavelength region. To selectively reflect means reflecting the light ray L in a specific wavelength region and not reflecting (transmit or absorb) the light ray L in a wavelength region other than the specific wavelength region.

In the present embodiment, a mode in which the plurality of wavelength selection regions 32 selectively transmit the light rays L of mutually different wavelength regions will be described as an example.

Further, in the present embodiment, a case where the light selection unit 30 has two wavelength selection regions 32, that is, a first wavelength selection region 32A and a second wavelength selection region 32B will be described as an example.

The size of the wavelength selection region 32 is larger than the wavelength at which light is selectively transmitted or reflected. For example, the size of the wavelength selection region 32 is one micrometer or more. However, the size of the wavelength selection region 32 is not limited to this.

In addition, the size of the wavelength selection region 32 is sufficiently smaller than the focal length of the first image formation element 20. For example, if a focal length f of the first image formation element 20 is 100 mm, a size s of the wavelength selection region 32 is 1 mm or less. However, the size of the wavelength selection region 32 is not limited to this. The relationship between the focal length f and the size s of the wavelength selection region 32 is expressed by the following equation (1):

$$s < f \qquad (1)$$

The first wavelength selection region 32A transmits the light ray L in the first wavelength region and does not transmit the light ray L in a wavelength region other than the first wavelength region (which will be described as a second wavelength region). In the present embodiment, a mode in which the second wavelength selection region 32B does not transmit the light rays L in the first wavelength region and the second wavelength region will be described as an example.

For example, assume that the light ray L in the first wavelength region is a blue light ray L (with a wavelength of 450 nm). In this case, the first wavelength selection region 32A transmits the blue light ray L and does not transmit the non-blue light ray L. The second wavelength selection region 32B does not transmit the blue light ray L and the non-blue light rays L.

The plurality of wavelength selection regions 32 (the first wavelength selection region 32A and the second wavelength selection region 32B) has different azimuth angles with respect to the optical axis Z of the first image formation element 20.

That the azimuth angle with respect to the optical axis Z is different means that the azimuth angle ranges of all the regions of the plurality of wavelength selection regions 32 are different from each other. The azimuth angle range refers to a range of azimuth angles from the minimum value to the maximum value of the azimuth angle with respect to the optical axis Z of each of the plurality of points included in all the regions within one wavelength selection region 32. For example, the azimuth angle range of an annular region centered on the optical axis Z is 0° to 360°. In addition, the azimuth angles of concentric annular rings centering on the optical axis Z and forming the annular region are equal.

In the present embodiment, the plurality of wavelength selection regions 32 (the first wavelength selection region 32A and the second wavelength selection region 32B) is arranged at different positions on the XY plane of the light selection unit 30 so that their respective azimuth angles with respect to the optical axis Z are different from each other. In the present embodiment, a case where the first wavelength selection region 32A is arranged at a position deviated from the optical axis Z in the light selection unit 30 will be described as an example. That is, the first wavelength selection region 32A is a region that does not include the focal point of the first image formation element 20 in the light selection unit 30. Further, in the present embodiment, a case where the second wavelength selection region 32B is arranged at a position including the optical axis Z of the first image formation element 20 in the light selection unit 30 will be described as an example. That is, the second wavelength selection region 32B is a region that includes the focal point of the first image formation element 20 in the light selection unit 30.

Next, the optical action of the optical inspection device 1A will be described.

The light ray R emitted from the irradiation unit 10 is applied to the subject S. As described above, in the present embodiment, a case where the light ray R passes through the subject S will be described as an example.

When the light ray R passes through the subject S, the light ray R is scattered by the subject S. Scattering means that the direction of the incident light ray R is deviated or the incident light ray R is branched into various directions. The scattering of the light ray R by the subject S includes reflection of the light ray R by the subject S. Therefore, the scattering of the light ray R by the subject S means deviation or branching of the light ray direction that may occur when the light ray R passes through the subject S or reflects the subject S. When the light ray R passes through the subject S, the deviation of the light ray direction means the deviation of the light ray R from the incident direction on the subject S. When the light ray R reflects the subject S, the deviation of the light ray direction means the deviation of the light ray R with respect to the regular reflection direction of the subject S.

A case where the light ray R passes through the subject S and turns into scattered light that is branched into a first light ray L1 and a second light ray L2. The first light ray L1 and the second light ray L2 are light rays L whose directions are different from each other.

In the present embodiment, a case where the direction of the second light ray L2 is a direction along the optical axis Z. The direction of the second light ray L2 is the direction of the second light ray L2 from the subject S to the first image formation element 20 (see FIG. 2). Further, a case where the direction of the first light ray L1 is a direction deviated from the optical axis Z. The direction of the first light ray L1 is the direction of the first light ray L1 from the subject S to the first image formation element 20 (see FIG. 2).

In this case, the second light ray L2, which is the light ray L along the optical axis Z, passes through the first image formation element 20, thereby to pass through the focal point on the focal plane of the first image formation element 20. On the other hand, the first light ray L1 is in the direction deviated from the optical axis Z, and the angle formed by the optical axis Z and the direction of the first light ray L1 is larger than 0°. The first light ray L1 does not pass through the focal point of the first image formation element 20 because it is not in the direction along the optical axis Z and is not parallel to the optical axis Z.

Arranged on the focal plane of the first image formation element 20 are the light selection unit 30 having the first wavelength selection region 32A and the second wavelength selection region 32B different in azimuth angle from each other.

As described above, the first wavelength selection region 32A and the second wavelength selection region 32B have different azimuth angles with respect to the optical axis Z. Specifically, in the present embodiment, the first wavelength selection region 32A is arranged at a position not including the focal point of the first image formation element 20. Further, in the present embodiment, the first wavelength selection region 32A selectively transmits the light ray L in the first wavelength region. The second wavelength selection region 32B is arranged at a position including the focal point of the first image formation element 20. In the present embodiment, the second wavelength selection region 32B does not transmit the light rays L in the first wavelength region and the second wavelength region.

Therefore, when the first light ray L1 is a light ray L in the first wavelength region, the first light ray L1 which is a light ray L in the first direction passes through the first wavelength selection region 32A. As illustrated in FIG. 2, due to the basic properties of the lens that is the first image formation element 20, the light rays L in the first direction and the first light rays L1 in the first wavelength region can all pass through the first wavelength selection region 32A.

On the other hand, the second light ray L2 is a light ray L in the direction along the optical axis Z, and thus does not reach the first wavelength selection region 32A. The second light ray L2 is a light ray L in the second wavelength region that does not pass through the first wavelength selection region 32A. Thus, the second light ray L2 does not pass through the first wavelength selection region 32A.

Therefore, the light selection unit 30 can determine whether each of the light rays L incident on the first image formation element 20 in all directions is parallel to the first direction that is the direction in which to reach the first wavelength selection region 32A. In the present embodiment, the second wavelength selection region 32B transmits neither the light rays L in the first wavelength region nor the second wavelength region. Therefore, of the light rays L incident on the first image formation element 20, the second light rays L2 in the second direction parallel to the optical axis Z are all blocked by the light selection unit 30.

That is, in the optical inspection device 1A of the present embodiment, it is determined whether each of the light rays L that are light scattered by the subject S can pass through the wavelength selection region 32 of the light selection unit 30 depending on whether the light ray L is in the first direction or the second direction.

The first light rays L1 having passed through the first wavelength selection region 32A of the light selection unit 30 are received by the detection element 40.

The light receiving surface 41 of the detection element 40 is arranged on the image plane of the subject S with respect to the first image formation element 20. Specifically, the detection element 40 is arranged such that the image plane of the subject S with respect to the first image formation element 20 and the light receiving surface 41 of the detection element 40 coincide with each other. Thus, the image of the subject S is formed on the light receiving surface 41.

In the present embodiment, the detection element 40 can selectively capture an image of the first light ray L1 in the first wavelength region and in the first direction which is the specific direction. That is, the detection element 40 can obtain the scattering characteristic information of the light rays L that have reached the light receiving surface 41 via the light selection unit 30 by acquiring the captured image.

Returning to FIG. 1, the explanation will be continued. Next, the information processing device 50 will be described.

The information processing device 50 is connected to the detection element 40 so as to be capable of sending and receiving data or signals. The information processing device 50 analyzes the image captured by the detection element 40.

Figure 3:
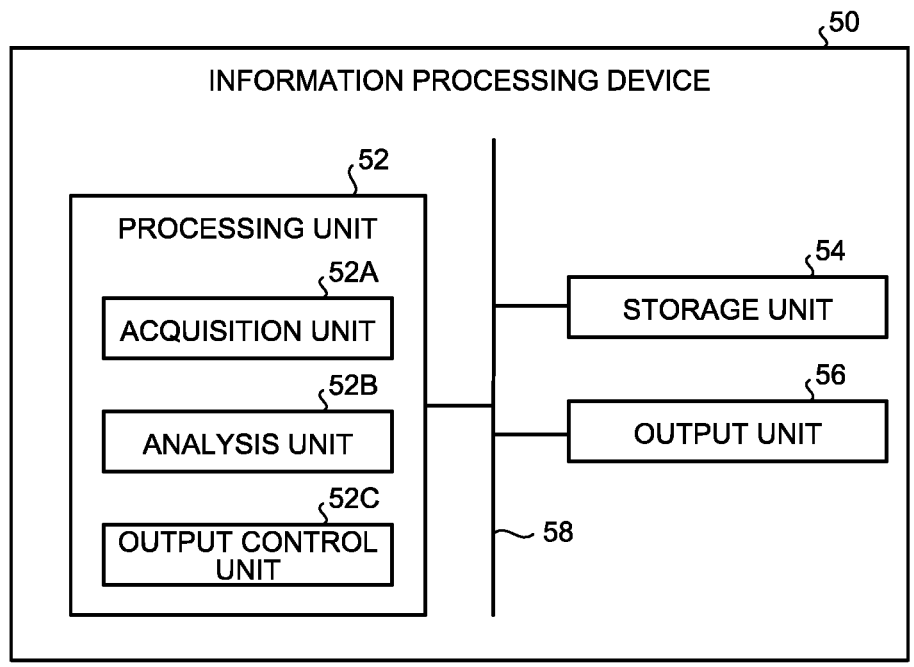
FIG. 3 is a block diagram of a functional configuration of an information processing device according to the first embodiment.

FIG. 3 is a block diagram illustrating an example of a functional configuration of the information processing device 50. The information processing device 50 includes a processing unit 52, a storage unit 54, and an output unit 56. The processing unit 52, the storage unit 54, and the output unit 56 are connected via a bus 58 to exchange data or signals.

The storage unit 54 stores various data. The storage unit 54 is, for example, a random access memory (RAM), a semiconductor memory element such as a flash memory, a hard disk, an optical disk, or the like. The storage unit 54 may be a storage device provided outside the information processing device 50. The storage unit 54 may be a storage medium. Specifically, the storage medium may be one in which programs and various kinds of information are downloaded and stored or temporarily stored via a local area network (LAN), the internet, or the like. The storage unit 54 may be composed of a plurality of storage media.

The output unit 56 outputs various kinds of information. For example, the output unit 56 includes at least one of a display, a speaker, and a communication unit that communicates with an external device via a network.

The processing unit 52 includes an acquisition unit 52A, an analysis unit 52B, and an output control unit 52C. At least one of the acquisition unit 52A, the analysis unit 52B, and the output control unit 52C is implemented by, for example, one or more processors. For example, each of the above units may be implemented by causing a processor such as a central processing unit (CPU) to execute programs, that is, by the use of software. Each of the above units may be implemented by a processor such as a dedicated integrated circuit (IC), that is, by hardware. Each of the above units may be implemented by using software and hardware in combination. When using a plurality of processors, each processor may implement one of the units or two or more of the units.

The acquisition unit 52A acquires a captured image from the detection element 40. That is, the acquisition unit 52A acquires a captured image as the scattering characteristic information.

The analysis unit 52B analyzes the scattering characteristic information acquired by the acquisition unit 52A. The analysis unit 52B analyzes the scattering characteristic information to derive analysis results of at least one of distance information, refractive index distribution, scattering intensity, surface shape, constituent material, and three-dimensional structure reconstruction of the subject S.

As described above, the detection element 40 in the present embodiment selectively captures an image of the first light ray L1 in the first wavelength region and in the first direction which is the specific direction. That is, in the present embodiment, the scattering characteristic information that is a captured image obtained by imaging is a captured image that is obtained by selectively capturing an image of the first light ray L1 in the first wavelength region that is the certain wavelength region and in the first direction that is the specific direction. Therefore, this captured image represents the angular distribution characteristic of scattered light resulting from incident light from a certain specific angle.

The analysis unit 52B analyzes the captured image to determine whether the scattering direction of each point of the subject S is the first direction. Based on the determination result, the analysis unit 52B can derive analysis results of at least one of distance information, refractive index distribution, scattering intensity, surface shape, constituent material, and three-dimensional structure reconstruction of the subject S.

The analysis unit 52B may detect the abnormality of the subject S based on the result of comparison between the scattering characteristic information and reference characteristic information stored in advance. For example, the optical inspection device 1 captures an image of a reference subject as a reference instead of the subject S. The analysis unit 52B stores this captured image as reference characteristic information in advance. The reference subject is the subject S as a reference. As the reference subject, for example, the subject S that can be determined to be normal may be used. For example, assume that the subject S is an object including a laser weld region. In this case, the subject S whose laser weld region is in a welded state desired by the user may be used as the reference subject.

Then, the analysis unit 52B may detect the subject S as abnormal when the scattering characteristics in the scattering characteristic information of the subject S and the reference characteristic information differ from each other by a predetermined reference value or more.

The output control unit 52C outputs the analysis result of the analysis unit 52B to the output unit 56. The output control unit 52C may further output the result of detection of the presence or absence of abnormality in the subject S by the analysis unit 52B to the output unit 56. By outputting at least one of the analysis result and the detection result to the output unit 56, this information can be easily provided to the user.

Figure 4:
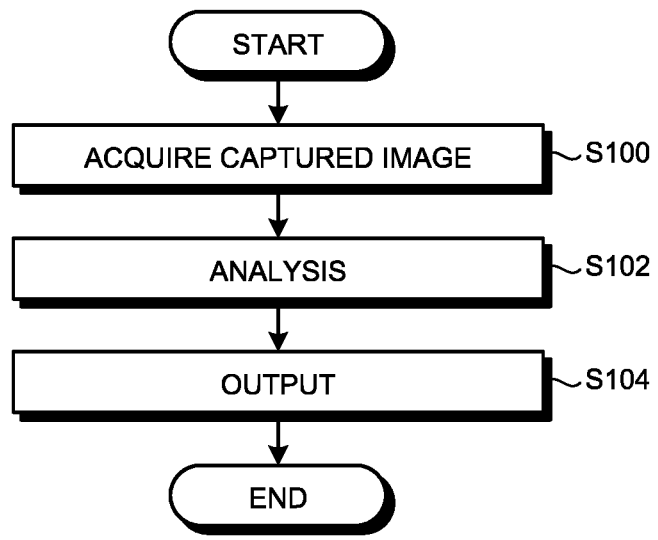
FIG. 4 is a flowchart illustrating a flow of analysis processing according to the first embodiment.

Next, an example of a flow of an analysis process executed by the information processing device 50 will be described. FIG. 4 is a flowchart illustrating an example of the flow of the analysis process executed by the information processing device 50.

First, the acquisition unit 52A acquires the scattering characteristic information, which is a captured image, from the detection element 40 (step S100). The analysis unit 52B analyzes the scattering characteristic information acquired in step S100 (step S102). The output control unit 52C outputs the result of the analysis in step S102 to the output unit 56 (step S104). Then, the information processing device 50 terminates this routine.

As described above, the optical inspection device 1A of the present embodiment includes the light selection unit 30, the detection element 40, and the first image formation element 20. The light selection unit 30 has the plurality of wavelength selection regions 32 that selectively transmits or reflects the light rays L of mutually different wavelength regions. The detection element 40 detects scattering characteristic information of the light rays L having reached the light receiving surface 41 via the light selection unit 30. The first image formation element 20 causes the light rays L that are light rays L scattered by the subject S to enter the light receiving surface 41 via the light selection unit 30. The plurality of wavelength selection regions 32 has different azimuth angles with respect to the optical axis Z of the first image formation element 20.

As described above, the optical inspection device 1A of the present embodiment includes the light selection unit 30. The light selection unit 30 includes the plurality of wavelength selection regions 32. The plurality of wavelength selection regions 32 selectively transmits or reflects the light rays L of mutually different wavelength regions, and has different azimuth angles with respect to the optical axis Z of the first image formation element 20.

Thus, in the optical inspection device 1A of the present embodiment, it is possible to selectively detect the light rays L in a specific wavelength region (for example, the first wavelength region) and in a specific direction (for example, the first direction). Therefore, it is possible to easily and accurately determine whether the scattering direction of each point of the subject S is the specific direction (for example, the first direction) by the scattering characteristic information (captured image) that is the detection result.

On the other hand, when the plurality of wavelength selection regions 32 of the light selection unit 30 (the first wavelength selection region 32A and the second wavelength selection region 32B) are the same in the azimuth angle with respect to the optical axis Z of the first image formation element 20, the azimuth angles of light rays having passed through different selection regions cannot be distinguished. That is, the azimuth angle information of the scattering direction cannot be obtained. According to the present embodiment, the wavelength selection regions 32 are different in azimuth angle, which makes it possible to obtain the azimuth angle information of the scattering direction.

The size of the wavelength selection region 32 is larger than the wavelength at which light is selectively transmitted or reflected. Therefore, compared to a case where the size of each wavelength selection region 32 is smaller than the wavelength, diffraction of light by the wavelength selection region 32 is less likely to occur. Light is generally diffracted when the size of each wavelength selection region 32 is close to or smaller than the wavelength, thereby changing the traveling direction of light. This causes an error in the scattering direction of the light finally received by the detection element 40. In the present embodiment, the size of the wavelength selection region 32 is larger than the wavelength at which light is selectively transmitted or reflected, thereby producing an effect of reducing the diffraction of light and making an error unlikely to occur.

In addition, the size s of the wavelength selection region 32 is sufficiently smaller than the focal length f of the first image formation element 20. That is, the above equation (1) holds. A scattering angle estimation error $\Delta\theta$ is expressed by the following equation (2):

$$\Delta\theta = s/f \qquad (2)$$

That is, since the size s of the wavelength selection region 32 is smaller than the focal length f, and thus the scattering angle estimation error can be suppressed.

Therefore, the optical inspection device 1A of the present embodiment can provide highly accurate scattering characteristic information of the subject S.

Modification 1

In relation to the above embodiment, the mode in which the first wavelength selection region 32A transmits the light ray L in the first wavelength region and does not transmit the light ray L in the second wavelength region that is a wavelength region other than the first wavelength region will be described as an example. Further, the case in which the second wavelength selection region 32B does not transmit the light rays L in the first wavelength region and the second wavelength region will be described as an example.

Alternatively, the second wavelength selection region 32B may not transmit the light ray L in the first wavelength region but may transmit the light ray L in the second wavelength region. As the second wavelength region, a specific wavelength within a wavelength region other than the first wavelength region may be set.

For example, assume that the light ray L in the first wavelength region is a blue light ray L. In this case, the first wavelength selection region 32A transmits the blue light ray L and does not transmit the non-blue light ray L. Further, for example, the second wavelength selection region 32B is configured to selectively transmit the red (for example, 650 nm) light ray L. In this case, the second wavelength selection region 32B does not transmit the blue light ray L but transmits the red light ray L.

Assume that the first light ray L1 is the light ray L in the first wavelength region (blue) and the second light ray L2 is the light ray L in the second wavelength region (red). The first light ray L1, which is the light ray L in the first direction that is not parallel to the optical axis Z, passes through the first wavelength selection region 32A. The second light ray L2, which is the light ray L in the second direction parallel to the optical axis Z, does not pass through the first wavelength selection region 32A, but passes through the second wavelength selection region 32B.

Therefore, in the present modification, in the detection element 40, the first light ray L1 that is the light ray L in the first direction and the second light ray L2 that is the light ray L in the second direction reach the detection element 40 at the same timing. That is, in the detection element 40, the light rays L of different colors depending on the directions of the light scattered by the subject S reach the detection element 40.

In this case, the detection element 40 may include a plurality of wavelength filters for each pixel. The plurality of wavelength filters is filters that selectively transmit light rays L having different wavelengths. By including a plurality of wavelength filters for each pixel, the detection element 40 can disperse light in each pixel.

That is, in the present modification, the detection element 40 can capture spectral images in which the first wavelength region and the second wavelength region are separated at the same time. That is, the detection element 40 can acquire images corresponding to the angles of scattering of the light rays L by the subject S at the same time.

Further, by capturing the spectral images, the detection element 40 can detect the scattering characteristic information of the light ray L in each of the first direction and the second direction. In other words, in the present modification, the detection element 40 can further acquire information on the light ray L in a direction different from the first direction, as compared with the first embodiment described above.

The analysis unit 52B of the information processing device 50 can analyze the spectral images that are the scattering characteristic information to analyze the scattering characteristic information of the light ray L in each of a plurality of directions, which is the light scattered by the subject S.

Therefore, in the present modification, it is possible to provide highly accurate scattering characteristic information of the subject S. Further, in the present modification, even if the subject S is the subject S accompanied by high-speed movement of cells or the like, it is possible to provide highly accurate scattering characteristic information of the subject S.

Further, in the present modification, the three-dimensional shape of the subject S can be reconstructed with high accuracy by analyzing the scattering characteristic information of the light rays L in a plurality of directions. For this analysis, for example, a photometric stereo method may be used.

Modification 2

In the foregoing first embodiment, a form in which the light ray R emitted from the irradiation unit 10 passes through the subject S and is scattered by the subject S has been described as an example. Then, in the foregoing first embodiment, the optical inspection device 1A has been described as an example of a form in which the light rays L, which are light scattered due to passage, are detected. However, the light ray R may be scattered by the subject S through reflection by the subject S. Then, the optical inspection device 1 may be in a form of detecting the light rays L which are light scattered by reflection.

Figure 5:
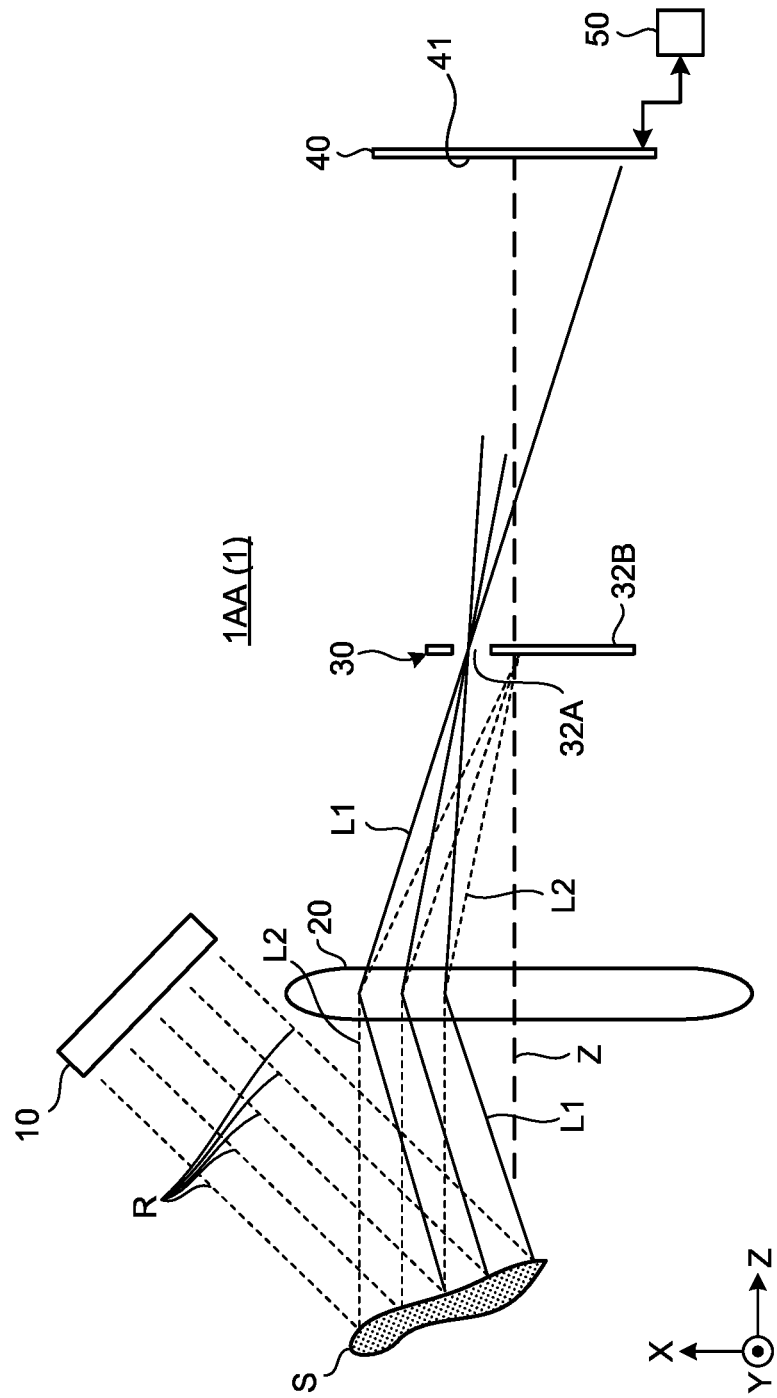
FIG. 5 is a schematic diagram of an optical inspection device according to a modification.

FIG. 5 is a schematic diagram illustrating an example of an optical inspection device 1AA of the present modification. The optical inspection device 1AA is an example of the optical inspection device 1A and the optical inspection device 1. The optical inspection device 1AA has the same configuration as the optical inspection device 1A, except that optical positions of each of an irradiation unit 10 and a subject S relative to other optical mechanisms provided in the optical inspection device 1AA are different from those in the optical inspection device 1A.

In the optical inspection device 1AA, an arrangement of at least one of the optical mechanisms included in the optical inspection device 1AA may be adjusted such that the light rays R emitted from the irradiation unit 10 are reflected by the subject S, and the light rays L, which are light scattered by the subject S, are imaged on a light selection unit 30 by a first image formation element 20.

In the present modification, the light ray R emitted from the irradiation unit 10 is reflected by the subject S and becomes scattered light that is branched into the first light ray L1 and the second light ray L2. The first light ray L1 and the second light ray L2 are imaged on the light selection unit 30 by the first image formation element 20, and the first light ray L1 selectively passes through the first wavelength selection region 32A.

Therefore, as in the first embodiment, the detection element 40 of the present modification can selectively capture an image of the first light ray L1 in the first wavelength region and in the first direction which is the specific direction. That is, the optical inspection device 1AA of the present modification can determine whether the direction of scattering at each point of the subject S is the first direction for the reflected light from the subject S as well.

This way, the optical inspection device 1AA may be configured to detect the scattering characteristic information of the light reflected by the subject S.

Modification 3

In the foregoing first embodiment, a mode in which the plurality of wavelength selection regions 32 provided in the light selection unit 30 selectively transmit the light rays L of mutually different wavelength regions will be described as an example. However, the plurality of wavelength selection regions 32 may selectively reflect the light rays L of mutually different wavelength regions.

To selectively reflect means reflecting the light ray L in a specific wavelength region and not reflecting (transmit or absorb) the light ray L in a wavelength region other than the specific wavelength region.

Figure 6:
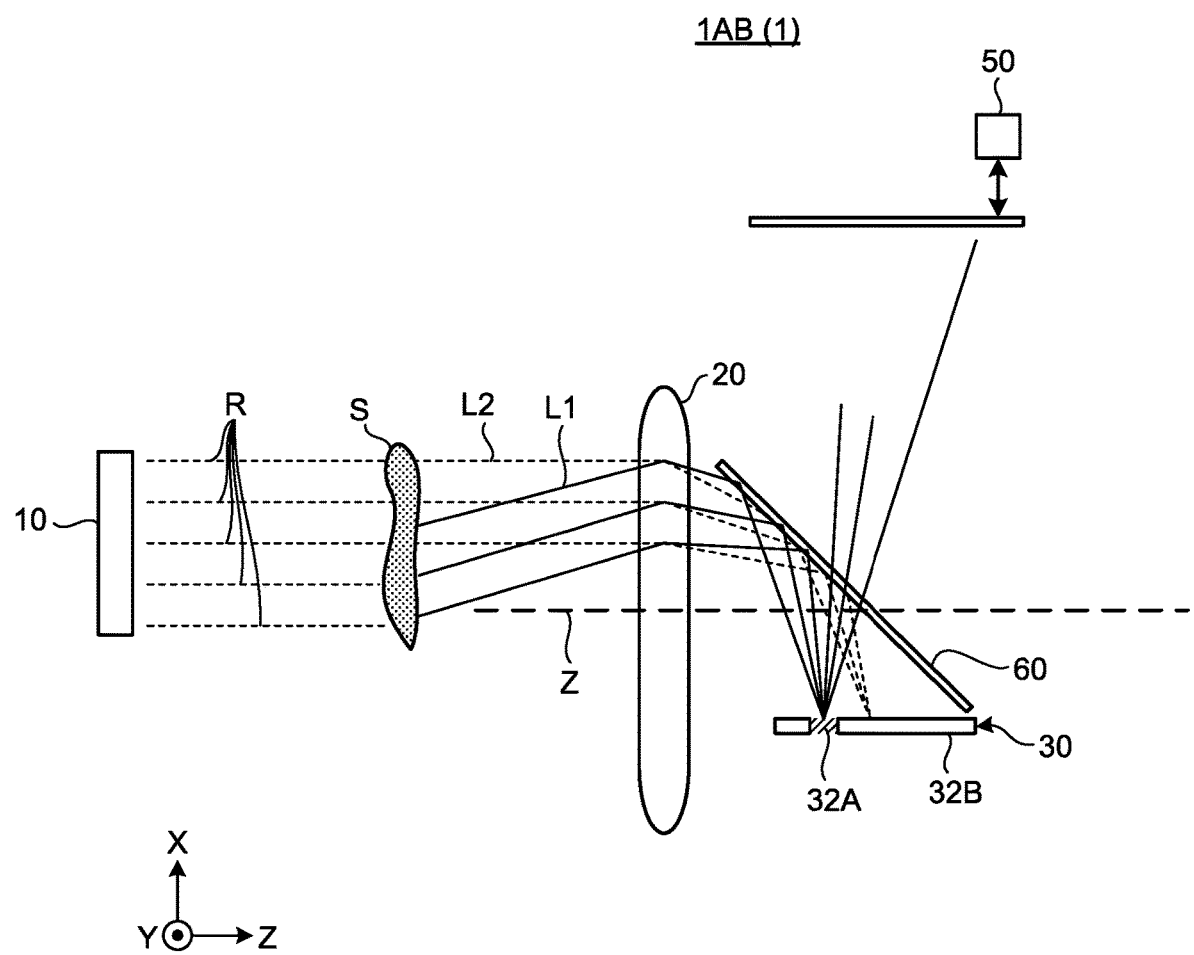
FIG. 6 is a schematic diagram of an optical inspection device according to a modification.

FIG. 6 is a schematic diagram illustrating an example of an optical inspection device 1AB of the present modification. The optical inspection device 1AB is an example of the optical inspection device 1A and the optical inspection device 1. The optical inspection device 1AB has the same configuration as the optical inspection device 1A, except that positions of a light selection unit 30 relative to other optical mechanisms provided in the optical inspection device 1AB are different from those in the optical inspection device 1A and that a dichroic mirror 60 is further included.

The dichroic mirror 60 reflects the light rays L that have passed through a first image formation element 20, and transmits the light reflected by the light selection unit 30.

The light selection unit 30 has the first wavelength selection region 32A and the second wavelength selection region 32B. In the present modification, the first wavelength selection region 32A selectively reflects the light ray L in the first wavelength region. That is, the first wavelength selection region 32A reflects the light ray L in the first wavelength region and does not reflect (transmit or absorb) the light ray L in the second wavelength region. In the present modification, a mode in which the second wavelength selection region 32B does not reflect (transmit or absorb) the light rays L in the first wavelength region and the second wavelength region will be described as an example.

The optical position of the light selection unit 30 and the positional relationship between the first wavelength selection region 32A and the second wavelength selection region 32B in the optical inspection device 1AB are the same as those in the optical inspection device 1A of the first embodiment.

In the present modification, the light ray R emitted from the irradiation unit 10 transmits through the subject S and becomes scattered light that is branched into the first light ray L1 and the second light ray L2. The first light ray L1 and the second light ray L2 pass through the first image formation element 20, and are reflected by the dichroic mirror 60 and imaged on the light selection unit 30. Of the light rays L having reached the light selection unit 30, the first light ray L1 in the first direction is reflected by the first wavelength selection region 32A and reaches the detection element 40 via the dichroic mirror 60. On the other hand, of the light rays L having reached the light selection unit 30, the second light ray L2 in the second direction is blocked by the light selection unit 30.

Therefore, as in the first embodiment, the detection element 40 of the present modification can selectively capture an image of the first light ray L1 in the first wavelength region and in the first direction which is the specific direction. Thus, the optical inspection device 1AB of the present modification can determine whether the direction of scattering at each point of the subject S is the first direction.

Second Embodiment

In the above embodiment, the form in which the light selection unit 30 has the two wavelength selection regions 32 has been described as an example. However, the light selection unit 30 is not limited to the mode having the two wavelength selection regions 32 but may be configured to include a plurality of wavelength selection regions 32 different in azimuth angle with respect to the optical axis Z of the first image formation element 20.

In the present embodiment, a form in which the light selection unit 30 has three wavelength selection regions 32 will be described as an example.

Figure 7:
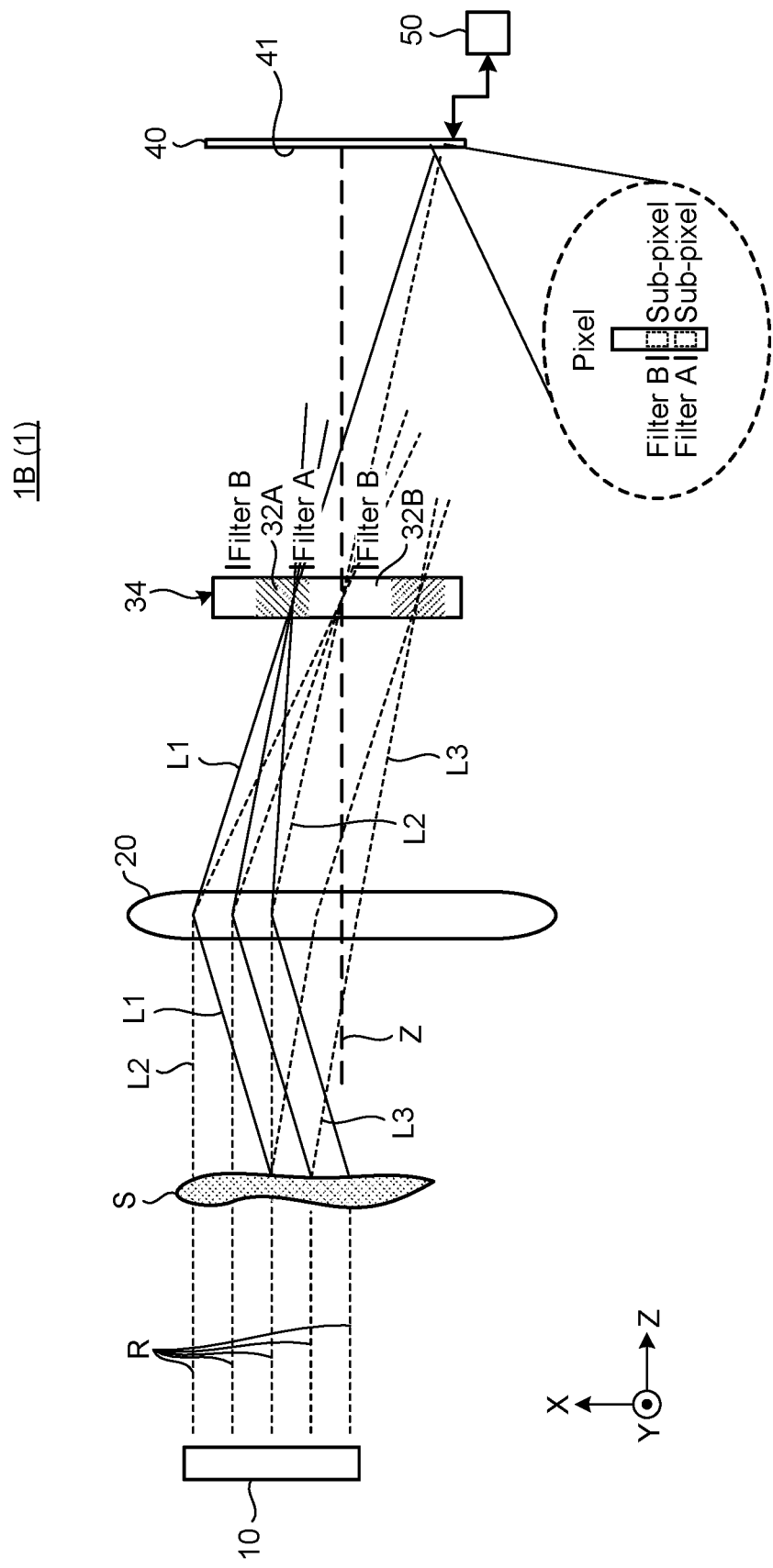
FIG. 7 is a schematic diagram of an optical inspection device according to a second embodiment.

FIG. 7 is a schematic diagram illustrating an example of an optical inspection device 1B of the present embodiment. The optical inspection device 1B is an example of the optical inspection device 1.

The optical inspection device 1B includes an irradiation unit 10, a first image formation element 20, a light selection unit 34, a detection element 40, and an information processing device 50.

The optical inspection device 1B has the same configuration as the optical inspection device 1A of the first embodiment except to include the light selection unit 34 instead of the light selection unit 30.

A case where the light selection unit 34 has three wavelength selection regions 32, that is, a first wavelength selection region 32A, a second wavelength selection region 32B, and a third wavelength selection region 32C will be described as an example. The light selection unit 34 is the same as the light selection unit 30 described in relation to the above embodiment, except to further include the second wavelength selection region 32C.

The first wavelength selection region 32A, the second wavelength selection region 32B, and the second wavelength selection region 32B selectively transmit or reflect light rays L of mutually different wavelength regions. In the present embodiment, a mode in which the first wavelength selection region 32A, the second wavelength selection region 32B, and the second wavelength selection region 32C selectively transmit the light rays L of mutually different wavelength regions will be described as an example.

As in the first embodiment, the first wavelength selection region 32A transmits the light ray L in a first wavelength region and does not transmit the light rays L in the wavelength regions other than the first wavelength region. Further, in the present embodiment, the second wavelength selection region 32B transmits the light ray L in a second wavelength region and does not transmit the light rays L in the wavelength regions other than the second wavelength region. The third wavelength selection region 32C selectively transmits the light ray L in a third wavelength region and does not transmit the light rays L in the wavelength regions other than the third wavelength region.

The first wavelength region, the second wavelength region, and the third wavelength region are different wavelength regions. For example, a case where the light ray L in the first wavelength region is a blue light ray L (with a wavelength of 450 nm), the light ray L in the second wavelength region is a red light ray L (with a wavelength of 650 nm), and the light ray L in the third wavelength region is a green light ray L (with a wavelength of 550 nm) will be described as an example.

Thus, the first wavelength selection region 32A transmits the blue light ray L in the first wavelength region, the second wavelength selection region 32B transmits the red light ray L in the second wavelength region, and the third wavelength selection region 32C transmits the green light ray L in the third wavelength region.

As in the first embodiment, the plurality of wavelength selection regions 32 (the first wavelength selection region 32A, the second wavelength selection region 32B, and the third wavelength selection region 32C) has different azimuth angles with respect to the optical axis Z of the first image formation element 20.

In the present embodiment, as in the first embodiment, a case where the first wavelength selection region 32A is arranged at a position deviated from the optical axis Z in the light selection unit 34 will be described as an example. Further, a case where the third wavelength selection region 32C is also arranged at a position deviated from the optical axis Z will be described as an example. That is, the first wavelength selection region 32A and the third wavelength selection region 32C are regions that do not include the focal point of the first image formation element 20 in the light selection unit 34. However, the azimuth angles of the first wavelength selection region 32A and the third wavelength selection region 32C with respect to the optical axis Z are different. Further, as in the first embodiment, a case where the second wavelength selection region 32B is arranged at a position including the optical axis Z of the first image formation element 20 in the light selection unit 34 will be described as an example. That is, the second wavelength selection region 32B is a region that does not include the focal point of the first image formation element 20 in the light selection unit 34.

Figure 8:
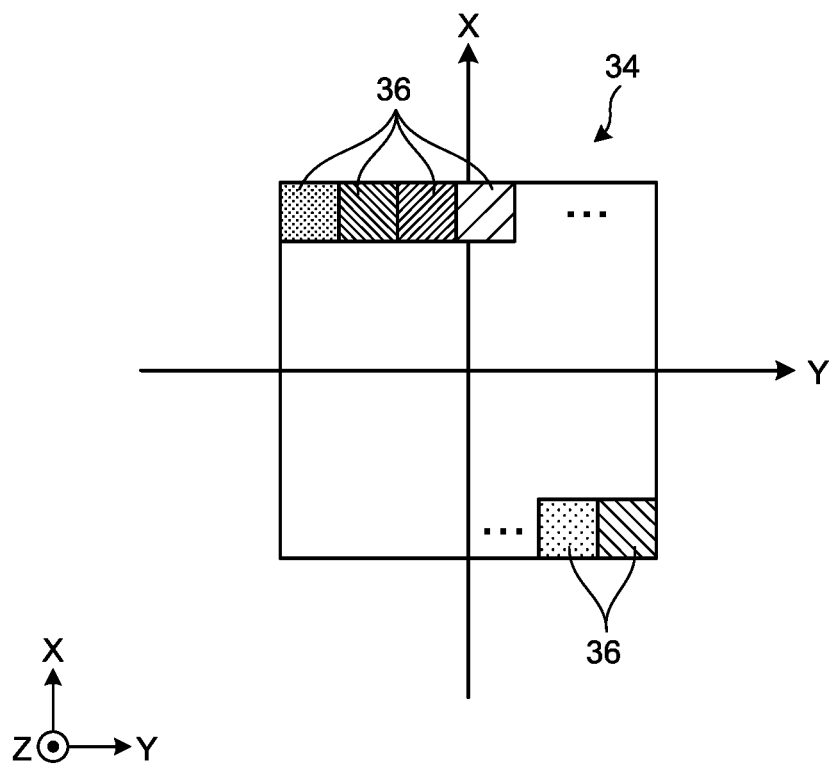
FIG. 8 is a schematic diagram of a light selection unit according to the second embodiment.

FIG. 8 is a schematic diagram of the light selection unit 34. FIG. 8 is an XY plan view of the light selection unit 34. As illustrated in FIG. 8, a light receiving surface of the light rays L of the light selection unit 34 is divided into a plurality of cells 36. Any of the first wavelength selection region 32A, the second wavelength selection region 32B, and the third wavelength selection region 32C is arranged in any of the plurality of cells 36. With this arrangement, a combination of wavelength selection regions 32 having different azimuth angles can be realized. Each of the cells 36 has the same size, which enables the optical diffraction scattering effects caused by the cells to be the same. Thus, removal of the image noise caused by the optical diffraction scattering effects is easily attainable. However, the sizes of the cells can be different from each other.

Returning to FIG. 7, the explanation will be continued. In the present embodiment, the detection element 40 includes a plurality of wavelength filters for each pixel, as in Modification 1. The plurality of wavelength filters is filters that selectively transmit light rays L having different wavelengths. In the present embodiment, the detection element 40 includes, for each pixel, a filter that selectively transmits the light ray L in each wavelength region of the first wavelength region, the second wavelength region, and the third wavelength region. Therefore, the detection element 40 can capture spectral images in which each pixel is spectrally dispersed in the first wavelength region, the second wavelength region, and the third wavelength region.

The detection element 40 may be capable of capturing spectral images of the same number as the number of the wavelength selection regions 32 provided in the light selection unit 34. That is, assume that the number of the wavelength selection regions 32 provided in the light selection unit 34 is N (N is an integer of 2 or greater). In this case, the detection element 40 may include N or more types of filters that selectively transmit light rays L having different wavelengths for each pixel.

Assume that the detection element 40 can identify all of the wavelength selection regions 32 by spectroscopy. That is, assume that a light ray having passed through two different regions of the wavelength selection regions 32 can always be identified by the detection element 40. Therefore, between the wavelength regions of the light ray having passed through two different regions of the wavelength selection regions 32, one wavelength region always has a wavelength (identification wavelength) that is not included in the other wavelength region. Further, assume that the detection element 40 can detect that wavelength (wavelength not included in other wavelength region).

Specifically, considered is a mode in which the light selection unit 34 has three wavelength selection regions 32, which are the first wavelength selection region 32A, the second wavelength selection region 32B, and the third wavelength selection region 32C. In this case, the detection element 40 may be capable of capturing spectral images in which three or more different wavelength regions including the first wavelength region, the second wavelength region, and the third wavelength region are dispersed.

Configuring the detection element 40 in this way makes it possible to maximize the scattering angle information that can be acquired by the detection element 40.

Next, the optical action of the optical inspection device 1B will be described.

The light ray R emitted from the irradiation unit 10 is applied to the subject S and passes through the subject S. When the light ray R passes through the subject S, the light ray R is scattered by the subject S. Since the definition of scattering has been described above, duplicated description thereof is omitted here.

A case where the light ray R passes through the subject S and turns into scattered light that is branched into a first light ray L1, a second light ray L2, and a third light ray L3. The first light ray L1, the second light ray L2, and the third light ray L3 are light rays L whose directions are different from each other. The directions of the light rays L (the first light ray L1, the second light ray L2, the third light ray L3) are the directions of the light rays L from the subject S to the first image formation element 20 as in the first embodiment.

As in the first embodiment, a case where the direction of the second light ray L2 is a direction along the optical axis Z and the direction of the first light ray L1 is a direction deviated from the optical axis Z. Further, in the present embodiment, a case where the direction of the third light ray L3 is a direction deviated from the optical axis Z.

In this case, the second light ray L2, which is the light ray L along the optical axis Z, passes through the first image formation element 20, thereby to pass through the focal point on the focal plane of the first image formation element 20. On the other hand, the first light ray L1 and the third light ray L3 are in directions deviated from the optical axis Z, and their angles formed with the direction of the optical axis Z are larger than 0°. The first light ray L1 and the third light ray L3 do not pass through the focal point of the first image formation element 20 because they are not in the direction along the optical axis Z and are not parallel to the optical axis Z.

Arranged on the focal plane of the first image formation element 20 are the light selection unit 34 having the first wavelength selection region 32A, the second wavelength selection region 32B, and the third wavelength selection region 32C different in azimuth angle from one another.

As described above, the first wavelength selection region 32A, the second wavelength selection region 32B, and the third wavelength selection region 32C have different azimuth angles with respect to the optical axis Z. Specifically, in the present embodiment, the first wavelength selection region 32A and the third wavelength selection region 32C are arranged at positions not including the focal point of the first image formation element 20. Further, in the present embodiment, the first wavelength selection region 32A selectively transmits the light ray L in the first wavelength region. The second wavelength selection region 32B is arranged at a position including the focal point of the first image formation element 20. Further, in the present embodiment, the second wavelength selection region 32B selectively transmits the light ray L in the second wavelength region. The third wavelength selection region 32C selectively transmits the light ray L in the third wavelength region.

Therefore, assume that the first light ray L1 is the light ray L in the first wavelength region, the second light ray L2 is the light ray L in the second wavelength region, and the third light ray L3 is the light ray L in the third wavelength region. In this case, the first light ray L1, which is the light ray L in the first direction, selectively passes through the first wavelength selection region 32A and is blocked by the second wavelength selection region 32B and the third wavelength selection region 32C. The second light ray L2, which is the light ray L in the second direction, selectively passes through the second wavelength selection region 32B and is blocked by the first wavelength selection region 32A and the third wavelength selection region 32C. Similarly, the third light ray L3, which is the light ray L in the third direction, selectively passes through the third wavelength selection region 32C and is blocked by the first wavelength selection region 32A and the second wavelength selection region 32B.

Therefore, the first light ray L1 in the first direction and the first wavelength region, the second light ray L2 in the second direction and the second wavelength region, and the third light ray L3 in the third direction and the third wavelength region reach the detection element 40 at the same timing. That is, the light rays L of different colors depending on the directions of the light scattered by the subject S reach the detection element 40.

As described above, the detection element 40 can capture spectral images in which each pixel is spectrally dispersed in the first wavelength region, the second wavelength region, and the third wavelength region at the same time. Therefore, the detection element 40 can acquire the information on the respective scattering angles in the first direction, the second direction, and the third direction over the entire areas of the captured images that are the spectral images. Therefore, the detection element 40 acquires the intensity ratio of scattered light in the first direction, the second direction, and the third direction as the intensity ratio of RGB for each of the plurality of pixels forming the captured images.

Such angular distribution of the scattering intensity ratio is called bidirectional reflectance distribution function (BRDF). That is, in the optical inspection device 1B of the present embodiment, BRDF can be acquired by imaging once (one shot) the entire surface of the captured image.

It is known that the surface shape and material of an object can be identified by BRDF. Therefore, using the optical inspection device 1B of the present embodiment makes it possible to acquire BRDF for the number of pixels by performing imaging once.

Further, by determining the direction of the light ray L of the light scattered by the subject S, the light ray L can be traced in the opposite direction from the image plane of the subject S. By tracing the light ray L in the opposite direction, the analysis unit 52B can acquire information regarding the depth direction of the subject S. Therefore, the analysis unit 52B can acquire the three-dimensional information of the subject S and reconstruct the three-dimensional structure of the subject S.

Therefore, in the present embodiment, in addition to the advantageous effects of the first embodiment, it is possible to provide more accurate scattering characteristic information of the subject S. Further, in the present embodiment, even if the subject S is the subject S accompanied by high-speed movement of cells or the like, it is possible to provide highly accurate scattering characteristic information of the subject S.

The detection element 40 can capture spectral images of the same number as the number of the wavelength selection regions 32 provided in the light selection unit 34. That is, the number of wavelength selection regions 32 provided in the light selection unit 34 is N (N is an integer of 2 or greater), and the detection element 40 includes N or more filters that selectively transmit the light rays L having different wavelengths for each pixel. This allows the detection elements 40 to distinguish all the directions of the light rays that have passed through different regions of the wavelength selection regions 32. On the other hand, if the number of filters is less than N, then among the two light rays that have passed through different regions of the wavelength selection regions 32, there is a light ray that cannot be detected by the detection element 40 or a light ray that cannot be distinguished. That is, according to the present embodiment, it is possible to identify the light ray direction with high accuracy.

Third Embodiment

In the present embodiment, a mode including a uniquely configured irradiation unit will be described.

Figure 9:
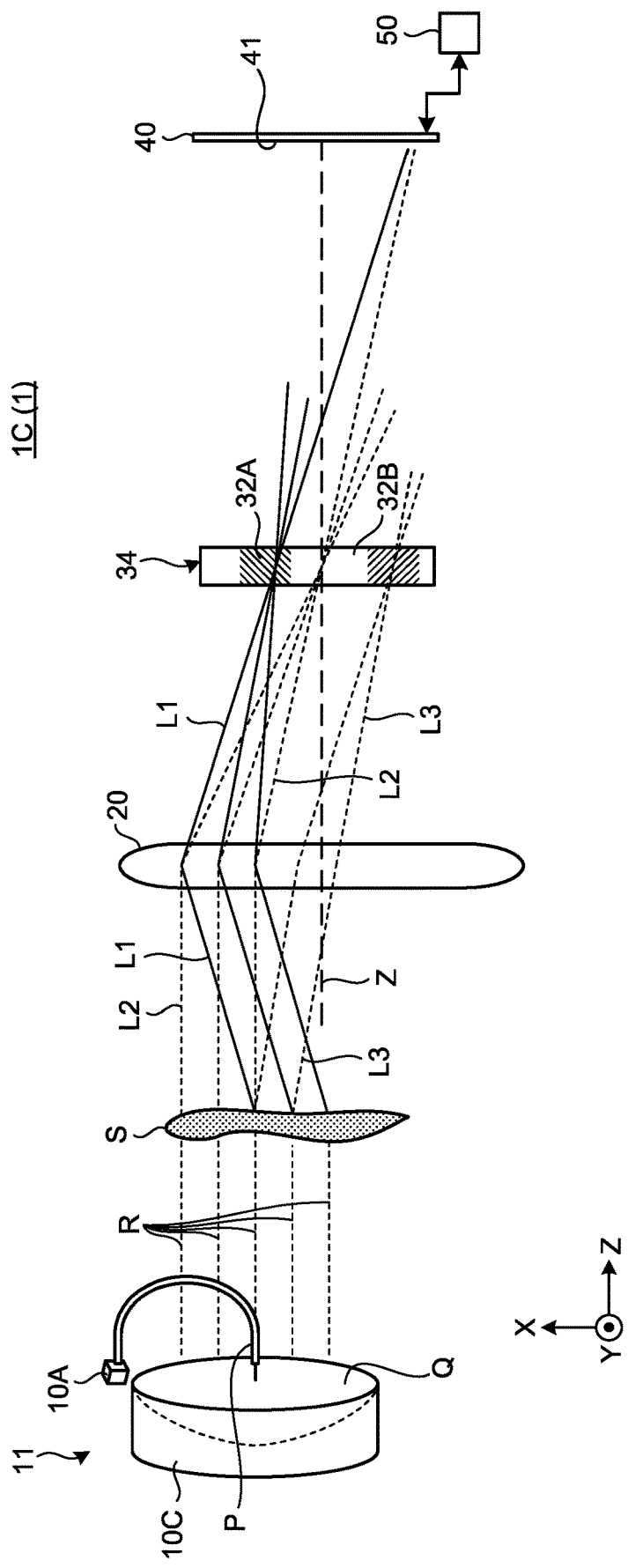
FIG. 9 is a schematic diagram of an optical inspection device according to a third embodiment.

FIG. 9 is a schematic diagram illustrating an example of an optical inspection device 1C of the present embodiment. The optical inspection device 1C is an example of the optical inspection device 1.

The optical inspection device 1C includes an irradiation unit 11 instead of the irradiation unit 10 in the optical inspection device 1B of the second embodiment (see FIG. 7). Except for this point, the optical inspection device 1C has the same configuration as the optical inspection device 1B. That is, the optical inspection device 1C is configured such that the irradiation unit 11 is incorporated into the optical inspection device 1B of the second embodiment.

The irradiation unit 11 includes a light source 10A, a light guide body 10B, and a reflector 10C.

The light source 10A is the same as in the first embodiment. In the present embodiment, a mode of the light source 10A that emits white light will be described as an example, as in the first embodiment. The light emitted from the light source 10A is not limited to white light.

The reflector 10C is an example of an optical element for irradiating the subject S with parallel light of the light ray R emitted from the light source 10A. The reflector 10C has a reflecting surface Q that reflects the incident light ray R in a direction that is parallel to the incident direction of the light ray R and opposite to the incident direction.

The light guide body 10B is an optical member that guides the light ray R emitted from the light source 10A to the focal point P of the reflector 10C. The focal point P of the reflector 10C is the focal point P of the reflecting surface Q.

The light guide body 10B is, for example, an optical fiber, but is not limited to this. One longitudinal end face of the light guide body 10B is optically connected to the light source 10A, and the other end face thereof is arranged at the focal point P of the reflecting surface Q.

Next, the optical operation of the optical inspection device 1C will be described.

The light ray R emitted from the light source 10A enters one longitudinal end face of the light guide body 10B and is emitted from the other longitudinal end face of the light guide body 10B by total internal reflection. The other end face of the light guide body 10B is arranged at the focal point P of the reflecting surface Q. Therefore, the light rays R emitted from the focal point P of the reflector 10C are all collimated by the geometrical optics. The collimated light ray R is applied to the subject S. That is, the irradiation unit 11 can irradiate the subject S with the collimated light ray R.

Even when the light source 10A is arranged at the focal point P of the reflector 10C, it is possible to irradiate the subject S with the parallel light ray R.

However, when the light source 10A is arranged at the focal point P of the reflector 10C, the light source 10A may shield the reflecting surface Q of the reflector 10C, resulting in a decrease in light efficiency. Thus, providing the irradiation unit 11 with the light guide body 10B and arranging the other end face of the light guide body 10B at the focal point P of the reflecting surface Q makes it possible to suppress a decrease in light efficiency.

Further, using a more transparent and narrower light guide body 10B as the light guide body 10B makes it possible to further suppress a decrease in light efficiency.

The collimated light rays R is applied to the subject S and scattered by passing through the subject S. As described in relation to the second embodiment, the light ray R turns into scattered light that is branched into the first light ray L1, the second light ray L2, and the third light ray L3, and reaches the first image formation element 20. The first light ray L1, which is the light ray L in the first direction, selectively passes through the first wavelength selection region 32A. The second light ray L2, which is the light ray L in the second direction, selectively passes through the second wavelength selection region 32B. Similarly, the third light ray L3, which is the light ray L in the third direction, selectively passes through the third wavelength selection region 32C.

Therefore, in the detection element 40, the first light ray L1 in the first direction and the first wavelength region, the second light ray L2 in the second direction and the second wavelength region, and the third light ray L3 in the third direction and the third wavelength region reach the detection element 40 at the same timing.

As in the second embodiment, the detection element 40 can capture spectral images in which each pixel is spectrally dispersed in the first wavelength region, the second wavelength region, and the third wavelength region at the same time. That is, the detection element 40 can acquire images corresponding to the angles of scattering of the light rays L by the subject S at the same time.

The analysis unit 52B provided in the information processing device 50 of the optical inspection device 1C analyzes the spectral images which are the scattering characteristic information, as in the second embodiment. For example, the analysis unit 52B can specify each of a plurality of scattering directions of each point of the subject S. That is, the analysis unit 52B can analyze the scattering characteristic information of the light ray L in each of a plurality of directions, which is the light scattered by the subject S.

As described above, in the present embodiment, the subject S is irradiated with the parallel light ray R. That is, in the present embodiment, the direction of the light ray R with which the subject S is irradiated is known.

Therefore, in the present embodiment, by analyzing the spectral image that is the scattering characteristic information, the analysis unit 52B can calculate the angle formed between the light ray L in each of the first direction, the second direction, and the third direction included in the light scattered by the subject S and the direction of the light ray R applied to the subject S. That is, the analysis unit 52B can calculate the absolute value of the angle of scattering by the subject S.

Therefore, in the present embodiment, in addition to the advantageous effects of the foregoing embodiments, it is possible to provide more accurate scattering characteristic information of the subject S. Further, in the present embodiment, even if the subject S is the subject S accompanied by high-speed movement of cells or the like, it is possible to provide further highly accurate scattering characteristic information of the subject S.

Further, the analysis unit 52B of the present embodiment can calculate the absolute value of the angle of scattering by the subject S. Therefore, in addition to the advantageous effects of the second embodiment, the analysis unit 52B of the present embodiment can provide, with higher accuracy, analysis results of at least one of the distance information, refractive index distribution, scattering intensity, surface shape, constituent material, and three-dimensional structure reconstruction of the subject S.

Fourth Embodiment

In the present embodiment, a form further including an image formation element will be described.

Figure 10:
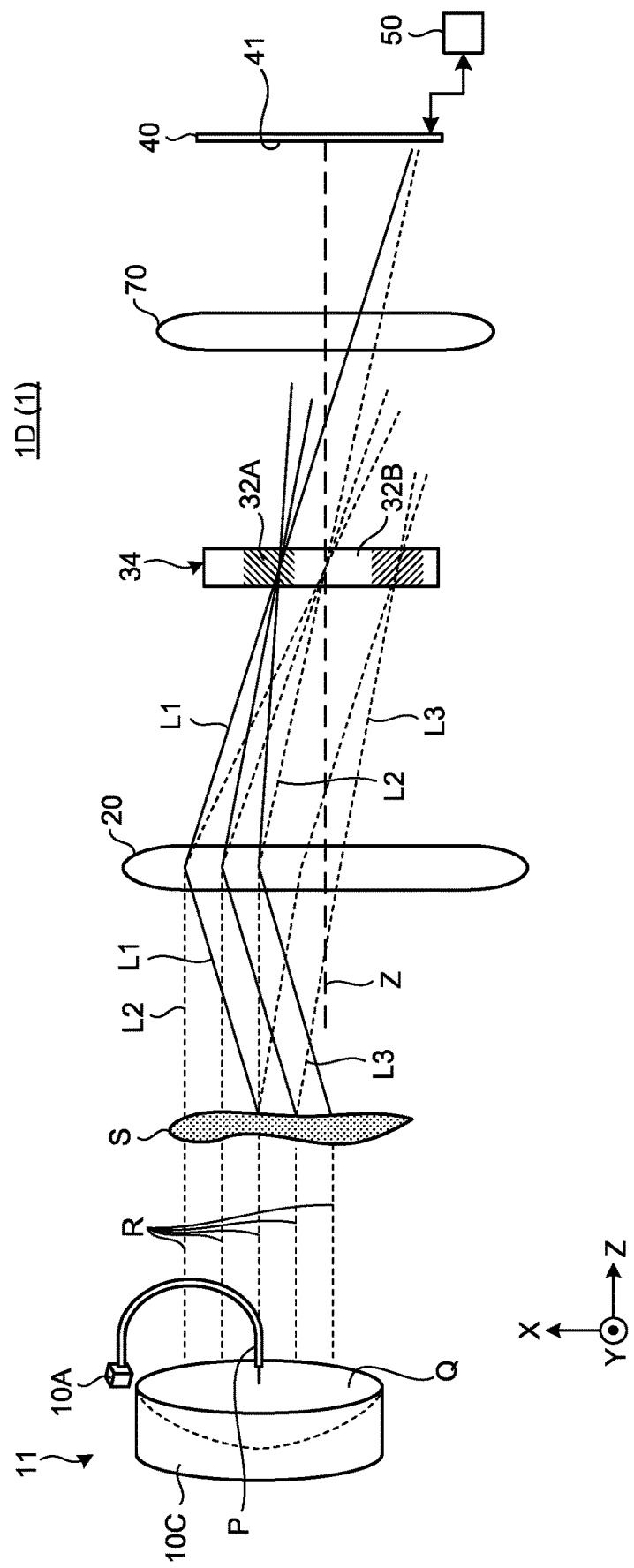
FIG. 10 is a schematic diagram of an optical inspection device according to a fourth embodiment.

FIG. 10 is a schematic diagram illustrating an example of an optical inspection device 1D of the present embodiment. The optical inspection device 1D is an example of the optical inspection device 1.

The optical inspection device 1D further includes a second image formation element 70 in addition to the components of the optical inspection device 1C (see FIG. 9) of the third embodiment.

The second image formation element 70 forms an image of the light ray L transmitted or reflected by a light selection unit 34 on a light receiving surface 41 of a detection element 40.

The second image formation element 70 is arranged between the light selection unit 34 and the detection element 40 in the direction (arrow Z direction) along an optical axis Z of the second image formation element 70. The optical axes Z of a first image formation element 20 and the second image formation element 70 coincide with each other.

The second image formation element 70 may be any element having an image formation performance for forming an image of light. The second image formation element 70 is, for example, a lens, a concave mirror, or the like. The material of the second image formation element 70 is not limited. For example, the first image formation element 20 is made of optical glass or optical plastic such as acrylic resin (PMMA) or polycarbonate (PC).

The magnification of image plane of the subject S due to the light ray L having passed through the light selection unit 34 can be adjusted by providing the second image formation element 70 and adjusting the position of the light selection unit 34 in the direction along the optical axis Z of the second image formation element 70.

Therefore, in the present embodiment, in addition to the advantageous effects of the foregoing embodiments, the magnification of the captured image obtained by the detection element 40 can be adjusted to a desired magnification.

The second image formation element 70 and the detection element 40 may be integrated. In this case, for example, a hyperspectral camera may be configured as the second image formation element 70 and the detection element 40.

Fifth Embodiment

The optical inspection device 1 may be configured such that a light ray from the light source 10A to the detection element 40 is folded with mirrors.

Figure 11:
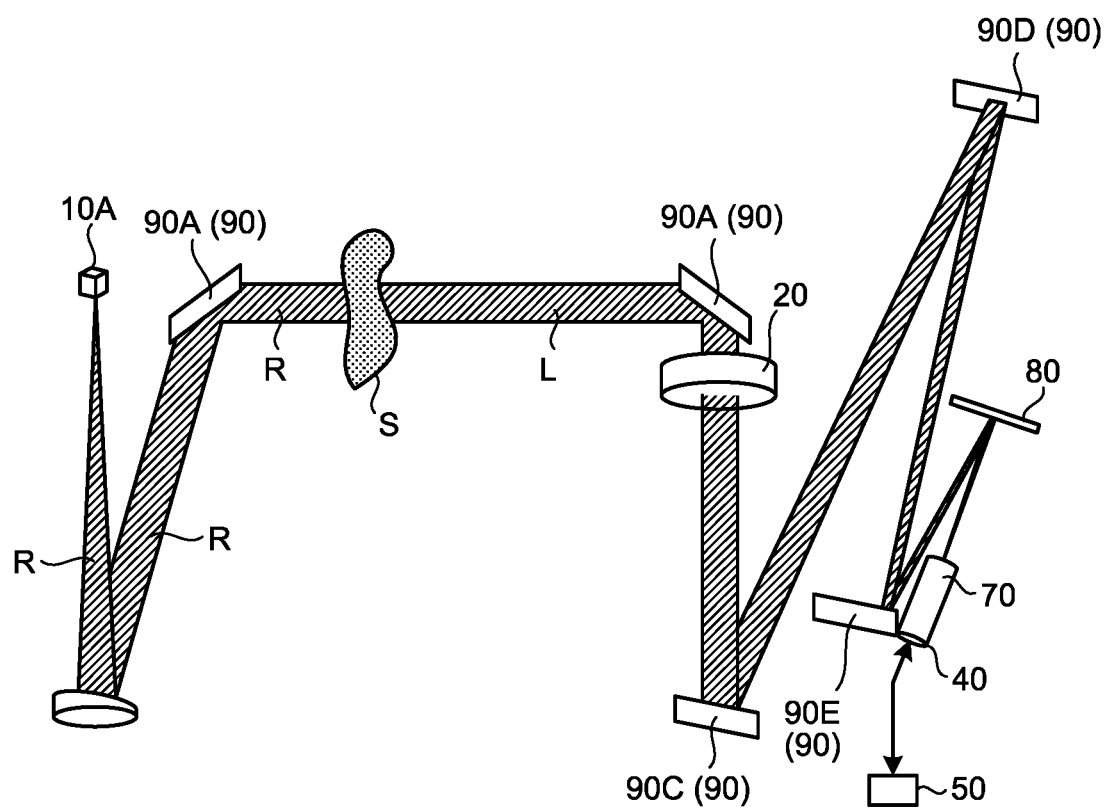
FIG. 11 is a schematic diagram of an optical inspection device according to a fifth embodiment.

FIG. 11 is a schematic diagram illustrating an example of an optical inspection device 1E of the present embodiment.

The optical inspection device 1E includes a light source 10A, a reflector 10C, a first image formation element 20, a detection element 40, a second image formation element 70, a digital micromirror device (DMD) 80, and mirrors 90.

The light source 10A, the reflector 10C, the first image formation element 20, the detection element 40, and the second image formation element 70 are the same as those in the foregoing embodiments. In the present embodiment, a case where an off-axis parabolic mirror is used as the reflector 10C will be described as an example. Further, in the present embodiment, a case where the hyperspectral camera is configured as the second image formation element 70 and the detection element 40 is taken as an example.

The optical inspection device 1E of the present embodiment includes a plurality of mirrors 90. FIG. 11 illustrates, as an example, a configuration including mirrors 90A to 90E as the mirrors 90. The mirrors 90 may be any optical mechanisms that reflect incident light. With the configuration including the plurality of mirrors 90, the light ray R emitted from the light source 10A passes through the subject S and the first image formation element 20 via the plurality of mirrors 90, and reaches the DMD 80. Therefore, it is possible to reduce the size of the entire optical inspection device 1E.

The DMD 80 is an example of the light selection unit 30. The DMD 80 is a mechanism for implementing the plurality of wavelength selection regions 32 described above in relation to the foregoing embodiments.

Specifically, the DMD 80 has a configuration in which a plurality of M micromirrors is arranged. M is an integer of 2 or greater. In the DMD 80, each of the plurality of micromirrors operates. The micromirrors can operate such that each of the plurality of micromirrors independently performs two actions of specularly reflecting the incident light ray L or blocking the light ray L (reflecting in a direction different from the specular reflection direction). That is, by the operation of the M micromirrors, the DMD 80 selects whether to pass or reflect light rays in specific directions (for example, the first light ray L1, the second light ray L2, and the third light ray L3) or to blocking the light rays. Therefore, the use of the DMD 80 implements up to M wavelength selection regions 32.

In addition, the DMD 80 can electrically operate the M micromirrors independently. Therefore, using the DMD 80 as the light selection unit makes it possible to change the directions of the light rays L that are to be selectively passed or reflected in time series.

For example, assume that the light ray R emitted from the light source 10A is monochromatic and the wavelength of the light ray R is only the first wavelength. Even in such a case, by operating the M micromirrors in time series, the detection element 40 can acquire captured images of scattered light at various scattering angles.

Next, an example of a hardware configuration of the information processing device 50 in the above embodiments and modifications will be described.

Figure 12:
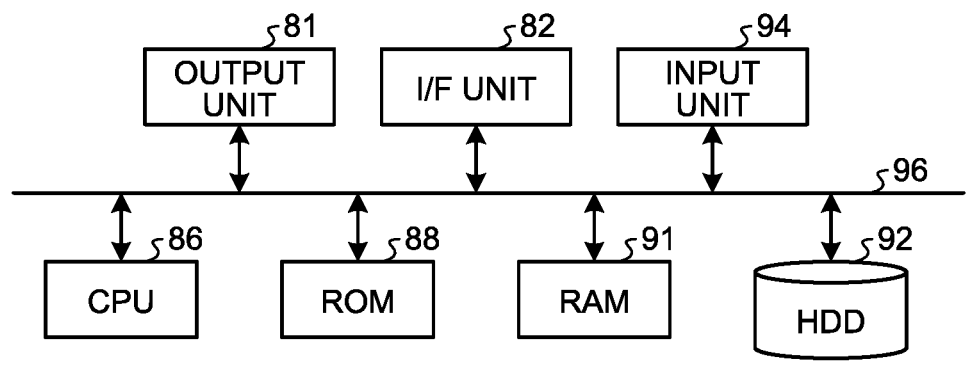
FIG. 12 is a hardware configuration diagram of the information processing device.

FIG. 12 is an example of a hardware configuration diagram of the information processing device 50 according to the above embodiments and modifications.

The information processing device 50 includes a control device such as a CPU 86, a storage device such as a read only memory (ROM) 88, a RAM 91, a hard disk drive (HDD) 92, an I/F unit 82 that is an interface with various devices, and an output unit 81 that outputs various kinds of information such as output information, an input unit 94 that accepts a user's operation, and a bus 96 that connects these units, and has a hardware configuration using a normal computer.

In the information processing device 50, the above units are implemented on the computer by the CPU 86 reading programs from the ROM 88 onto the RAM 91 and executing them.

The programs for executing the above processes to be executed by the information processing device 50 may be stored in the HDD 92. The programs for executing the above processes to be executed by the information processing device 50 may be provided in a form of being incorporated in the ROM 88 in advance.

The programs for executing the above processes to be executed by the information processing device 50 are files in an installable format or an executable format, which are stored in computer-readable storage media such as a CD-ROM, CD-R, memory card, digital versatile disk (DVD), and flexible disk (FD) and are provided as computer program products. The programs for executing the above processes to be executed by the information processing device 50 may be stored in a computer connected to a network such as the Internet and may be provided by being downloaded via the network. The programs for executing the above processes to be executed by the information processing device 50 may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection device comprising:
   a light selection unit that has three or more wavelength selection regions selectively transmitting or reflecting light rays of mutually different wavelength regions;
   a detection element that detects scattering characteristic information of the light rays having reached a light receiving surface via the light selection unit; and
   a first imaging element that causes scattered light composed at least of two light rays and scattered by a subject arranged between the first imaging element and an irradiation unit irradiating the subject with light emitted from a light source, to enter the light receiving surface arranged on an image plane of the subject with respect to the first imaging element via the light selection unit, wherein
   the three or more wavelength selection regions is different in azimuth angle with respect to an optical axis of the first imaging element,
   the light selection unit is arranged on a focal plane of the first imaging element and has mechanisms of selecting the light rays to transmit or reflect the light rays and making the light rays to have different wavelengths selectively according to the three or more wavelength selection regions, and
   the detection element
      includes, for each pixel, a plurality of wavelength filters the number of which is more than the number of the wavelength selection regions provided in the light selection unit, the plurality of wavelength filters selectively transmitting light rays having mutually different wavelengths, and
      by using the plurality of wavelength filters provided in the detection element, detects the scattering characteristic information including at least two different directions at a same time and detects the scattering characteristic information including the at least two different directions to capture spectral images enabling identifying wavelength selection regions having transmitted or reflected the light rays having reached the light receiving surface.

2. The optical inspection device according to claim 1, wherein
   the detection element captures the spectral images that are spectrally divided into a number of wavelength regions equal to or greater than a number of the wavelength selection regions provided in the light selection unit.

3. The optical inspection device according to claim 1, further comprising a second imaging element that forms an image of a light ray transmitted or reflected by the light selection unit on the light receiving surface.

4. The optical inspection device according to claim 1, further comprising an analysis unit that comprises a hardware processor that detects abnormality of the subject based on a result of comparison between the scattering characteristic information and reference characteristic information.

5. The optical inspection device according to claim 1, wherein
   the subject is an object containing a live cell or a laser welded area.

6. The optical inspection device according to claim 1, wherein
   the three or more wavelength selection regions is larger than a wavelength at which selective transmission or reflection is performed.

7. The optical inspection device according to claim 1, wherein
   the three or more wavelength selection regions is smaller than a focal length of the first imaging element.

8. The optical inspection device according to claim 1, wherein
   the three or more wavelength selection regions acts such that, when light rays pass through two wavelength selection regions among the three or more wavelength selection regions, one light ray has an identification wavelength that is not included in the wavelength region of the other light ray, and
   the detection element is capable of detecting the identification wavelength.

9. The optical inspection device according to claim 1, comprising an analysis unit comprising a hardware processor that analyzes the scattering characteristic information.

10. The optical inspection device according to claim 9, wherein
the analysis unit derives an analysis result of at least one of distance information, refractive index distribution, scattering intensity, surface shape, constituent material, and three-dimensional structure reconstruction of the subject.

11. The optical inspection device according to claim 1, further comprising:
an irradiation unit including
a light source; and
an optical element that irradiates the subject with parallel rays of light emitted from the light source.

12. The optical inspection device according to claim 11, wherein the optical element includes:
a reflector; and
a light guide body that guides the light ray emitted from the light source to a focal point of the reflector.

* * * * *

UNITED STATES PATENT AND TRADEMARK OFFICE
CERTIFICATE OF CORRECTION

PATENT NO. : 12,092,582 B2
APPLICATION NO. : 17/006935
DATED : September 17, 2024
INVENTOR(S) : Ohno et al.

It is certified that error appears in the above-identified patent and that said Letters Patent is hereby corrected as shown below:

In the Claims

Claim 1, Column 22, Line 1, "is different" should read as —are different—.

Claim 6, Column 22, Line 49, "is larger" should read as —are larger—.

Claim 7, Column 22, Line 54, "is smaller" should read as —are smaller—.

Claim 8, Column 22, Line 58, "acts" should read as —act—.

Signed and Sealed this
Fifth Day of November, 2024

Katherine Kelly Vidal
*Director of the United States Patent and Trademark Office*